United States Patent
Lee et al.

(10) Patent No.: US 9,301,221 B2
(45) Date of Patent: Mar. 29, 2016

(54) METHOD FOR RESELECTING CELL BY USER EQUIPMENT IN WIRELESS COMMUNICATION SYSTEM AND DEVICE THEREFOR

(71) Applicant: LG ELECTRONICS INC., Seoul (KR)

(72) Inventors: Youngdae Lee, Anyang-si (KR); Seungjune Yi, Anyang-si (KR); Sunghoon Jung, Anyang-si (KR); Sungjun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/387,825

(22) PCT Filed: Mar. 29, 2013

(86) PCT No.: PCT/KR2013/002654
§ 371 (c)(1),
(2) Date: Sep. 24, 2014

(87) PCT Pub. No.: WO2013/151279
PCT Pub. Date: Oct. 10, 2013

(65) Prior Publication Data
US 2015/0057002 A1    Feb. 26, 2015

Related U.S. Application Data

(60) Provisional application No. 61/619,397, filed on Apr. 2, 2012.

(51) Int. Cl.
H04W 4/00 (2009.01)
H04W 36/00 (2009.01)
H04W 36/06 (2009.01)
H04W 48/04 (2009.01)
H04W 88/06 (2009.01)

(52) U.S. Cl.
CPC .......... *H04W 36/0072* (2013.01); *H04W 36/06* (2013.01); *H04W 48/04* (2013.01); *H04W 88/06* (2013.01)

(58) Field of Classification Search
CPC ....................................................... H04W 60/00
USPC ........................................................ 455/435.1
See application file for complete search history.

(56) References Cited

U.S. PATENT DOCUMENTS

| | | | |
|---|---|---|---|
| 8,310,946 B2* | 11/2012 | Somasundaram et al. | 370/252 |
| 2010/0029274 A1 | 2/2010 | Deshpande et al. | |
| 2010/0093350 A1 | 4/2010 | Wang et al. | |
| 2010/0216469 A1* | 8/2010 | Yi et al. | 455/435.3 |
| 2010/0265918 A1 | 10/2010 | Marinier et al. | |
| 2011/0255509 A1 | 10/2011 | Huang et al. | |

FOREIGN PATENT DOCUMENTS

KR    10-2011-0102418 A    9/2011

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 10)," 3GPP TS 36.304 V10.5.0, Mar. 2012, pp. 1-33.

* cited by examiner

Primary Examiner — Huy C Ho
(74) Attorney, Agent, or Firm — Birch, Stewart, Kolasch & Birch, LLP (57) ABSTRACT

The present invention relates to a method and device for reselecting a cell by a user equipment in a wireless communication system. Particularly, a method for reselecting a cell by a user equipment comprises the steps of: setting a preferred frequency for cell reselection; forming at least one candidate cell except for a specific cell; and reselecting another cell in the frequency of the specific cell among the at least one candidate cell when the frequency of the specific cell is the same as the preferred frequency.

5 Claims, 8 Drawing Sheets

(a) control-plane protocol stack (b) user-plane protocol stack, SAE gateway

METHOD FOR RESELECTING CELL BY USER EQUIPMENT IN WIRELESS COMMUNICATION SYSTEM AND DEVICE THEREFOR

CROSS REFERENCE TO RELATED APPLICATIONS

This application is the National Phase of PCT International Application No. PCT/KR2013/002654, filed on Mar. 29, 2013 which claims priority under 35 U.S.C. 119(e) to U.S. Provisional Application No. 61/619,397, filed on Apr. 2, 2012, all of which are hereby expressly incorporated by reference into the present application.

TECHNICAL FIELD

The present invention relates to a wireless communication system, more particularly, to a method for a user equipment to reselect a cell in a wireless communication system and an apparatus therefor.

BACKGROUND ART

3GPP LTE ($3^{rd}$ generation partnership project long term evolution) communication system is schematically explained as an example of a wireless communication system to which the present invention is applicable.

Figure 1:
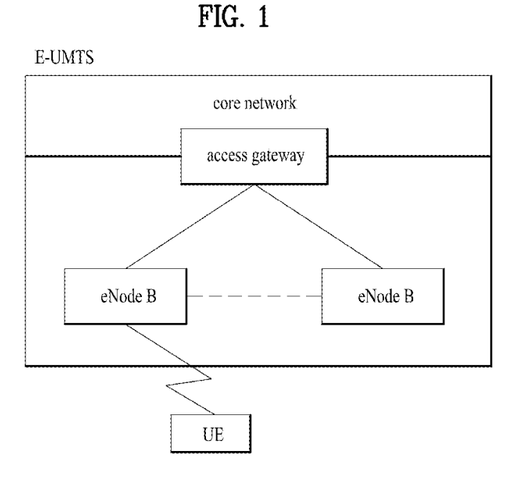
FIG. 1 is a schematic diagram of E-UMTS network structure as one example of a wireless communication system.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

An object of the present invention is to provide a method for a user equipment to reselect a cell in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing a cell reselection, which is performed by a user equipment in a wireless communication system, includes the steps of setting a prioritized frequency to perform the cell reselection, configuring one or more candidate cells from which a specific cell is excluded and if a frequency of the specific cell is identical to the prioritized frequency, reselecting a different cell on the frequency of the specific cell among the one or more candidate cells.

Moreover, if the frequency of the specific cell is different from the prioritized frequency, the method can further include the step of configuring the specific cell not to be reselected for a prescribed time.

Moreover, the prioritized frequency may correspond to a frequency providing an MBMS (multimedia broadcast and multicast service) or can be designated by a frequency of a CSG (closed subscriber group) cell to which the user equipment belongs thereto.

Moreover, the specific cell may correspond to a cell indicating that a status of the specific cell is cell-barred, a cell of which an RRC (radio resource control) connection request has failed, or a cell in which a timer for a cell-barred is working.

Moreover, the specific cell may correspond to a cell in which an intraFreqReselection field included in system information of the specific cell is set to "not allowed".

To further achieve these and other advantages and in accordance with the purpose of the present invention, according to a different embodiment, a user equipment performing a cell reselection in a wireless communication includes a radio frequency unit (RF unit) and a processor, the processor configured to set a prioritized frequency to perform the cell reselection, the processor configured to configure one or more candidate cells from which a specific cell is excluded, the processor, if a frequency of the specific cell is identical to the prioritized frequency, configured to reselect a different cell on the frequency of the specific cell among the one or more candidate cells.

Advantageous Effects

According to the present invention, a user equipment can perform a cell reselection in consideration of a frequency of high priority.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

Figure 2:
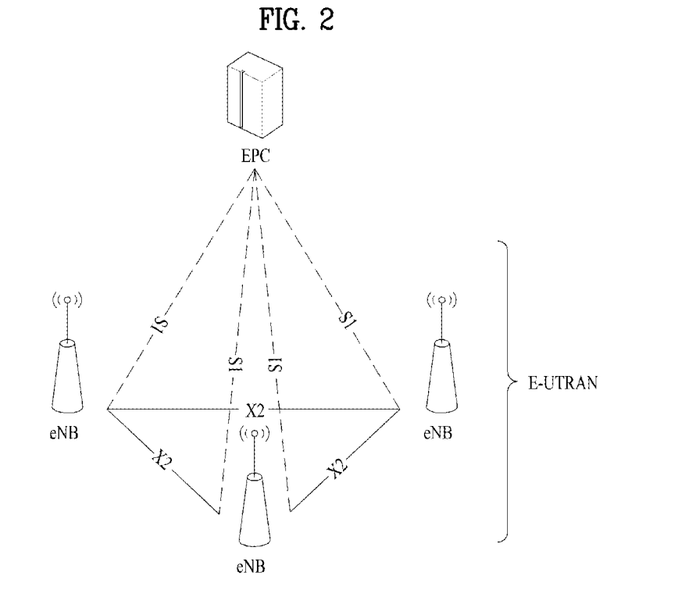
FIG. 2 is a conceptual diagram for a network structure of E-UTRAN (evolved universal terrestrial radio access network)

FIG. 2 is a conceptual diagram of E-UTRAN (evolved universal terrestrial radio access network) network structure. In particular, the E-UTRAN system is a system evolved from a conventional UTRAN system. The E-UTRAN consists of cells (eNBs) and the cells are connected to each other via X2 interface. A cell is connected to a user equipment via a radio interface and is connected to EPC (evolved packet core) through S1 interface.

The EPC includes MME (mobility management entity), S-GW (serving-gateway) and PDN-GW (packet data network-gateway). The MME has an access information of a user equipment or information on a capability of a user equipment. This information is mainly used for a mobility management of user equipment. The S-GW is a gateway having E-UTRAN as an end point. The PDN-GW is a gateway having PDN (packet data network) as an end point.

Figure 3:
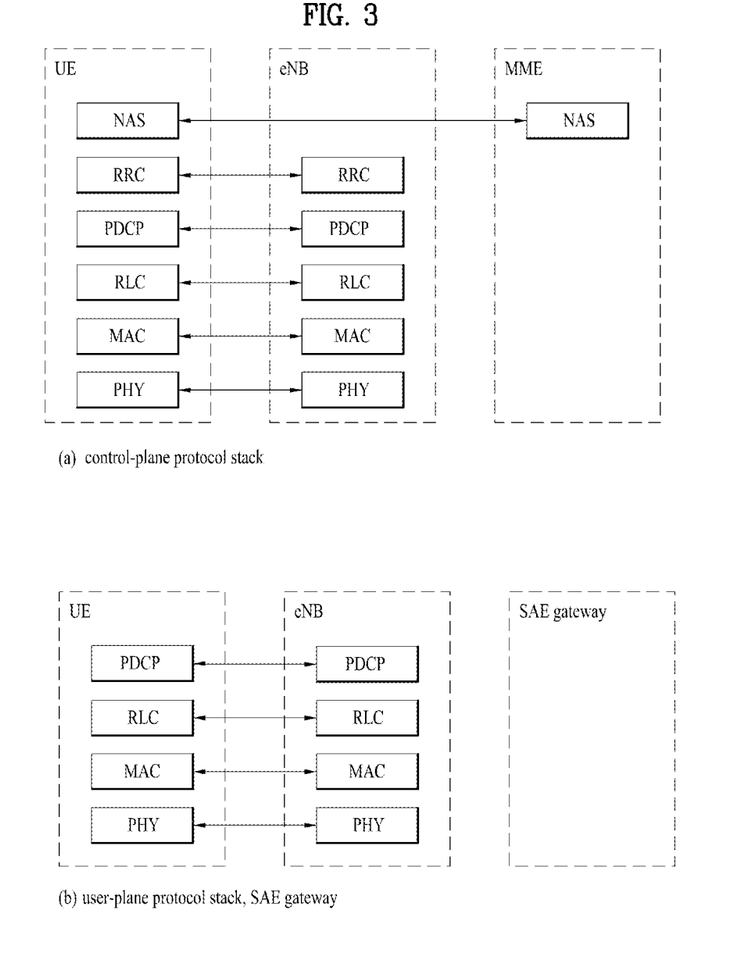
FIG. 3 is a diagram for structures of control and user planes of radio interface protocol between a 3GPP radio access network standard-based user equipment and E-UTRAN.

FIG. 3 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other.

In the following description, an RRC state of a user equipment and an RRC connecting method are explained. First of all, the RRC state may indicate whether the RRC of the user equipment is logically connected to the RRC of the E-UTRAN. If the RRCs are logically connected together, such a state can be named 'RRC_CONNECTED state'. Otherwise, such a state can be named 'RRC_IDLE state'.

Since E-UTRAN is able to recognize an existence of user equipment in the RRC_CONNECTED state by cell unit, the E-UTRAN is able to effectively control the corresponding user equipment. On the other hand, the E-UTRAN is unable to recognize the user equipment in the RRC_IDLE state by the cell unit. Hence, core network (CN) may manage the user equipment in the RRC_IDLE state by tracking area (TA) unit, which is a unit of area larger than a cell. Therefore, in order for the user equipment in RRC_IDLE state to receive such a service as a voice service, a data service from the cell, the corresponding user equipment should make a transition to an RRC_CONNECTED state.

When a user initially turns on a power of a user equipment, the user equipment searches for an appropriate cell and then stays in RRC_IDLE state in the found cell. If the user equipment staying in the RRC_IDLE state needs to establish an RRC connection, the user equipment establishes the RRC connection with an RRC of E-UTRAN and then makes a transition to RRC_CONNECTED state. In this case, a case of establishing an RRC connection may include a case that an uplink data transmission is required due to such a reason as a user's call attempt and the like, a case that a response message needs to be sent in response to a reception of a paging message from the E-UTRAN, and the like.

Meanwhile, an NAS (Non-access stratum) layer situated at the above of an RRC layer performs such a function as a session management and a mobility management and the like. In the NAS layer, two states, which correspond to an EMM (EPS mobility management) registered state (EMM-REGISTERED) and an EMM unregistered state (EMM-UNREGISTERED) are defined for a mobility management of a user equipment. These two states are applied to the user equipment and MME. An initial UE corresponds to the state of the EMM unregistered. The user equipment performs a process of registering to a corresponding network to access the network via an initial attach procedure. If the attach procedure is successfully performed, the user equipment and the MME become the state of EMM registered.

In particular, in the NAS layer, two states, which correspond to an ECM (EPS connection management) idle state (ECM_IDLE) and an ECM connected state (ECM_CONNECTED), are defined to manage a signaling connection between a user equipment and an EPC. These two states are applied to the user equipment and MME. If a user equipment in the state of ECM idle establishes an RRC connection with E-UTRAN, the corresponding user equipment becomes the user equipment in the state of ECM connected. If the MME in the state of ECM idle establishes an S1 connection with E-UTRAN, the MME becomes the MME in the state of ECM connected.

When a user equipment is in a state of ECM idle, E-UTRAN does not have information (context) on the user equipment. Hence, the user equipment in the state of ECM idle performs such a UE-based mobility related procedure as a cell selection, a cell re-selection, or the like without receiving a network command. On the contrary, when a user equipment is in a state of ECM connected, mobility of the user equipment is managed by the network command. If a position of a user equipment in a state of ECM idle changes from the position of which the network is aware, the corresponding position of the user equipment is informed to the network via a TA (tracking area) update process by the user equipment.

A single cell consisting of an eNode B in LTE system is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel).

Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 4:
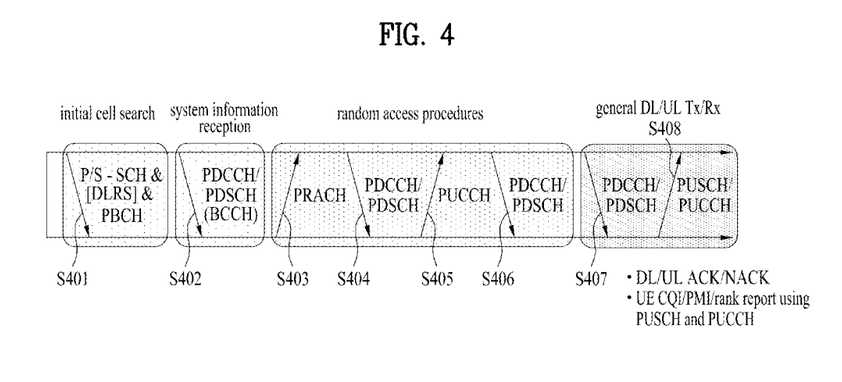
FIG. 4 is a diagram for explaining physical channels used for 3GPP system and a general signal transmission method using the physical channels.

FIG. 4 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S401]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S402].

Meanwhile, if a user equipment initially accesses an eNode B or does not have a radio resource for transmitting a signal, the user equipment may be able to perform a random access procedure to complete the access to the base station [S403 to S406]. To this end, the user equipment may transmit a specific sequence as a preamble on a physical random access channel (PRACH) [S403] and may be then able to receive a response message on PDCCH and the corresponding PDSCH in response to the preamble [S404]. In case of a contention based random access procedure (RACH), it may be able to additionally perform a contention resolution procedure.

Having performed the above mentioned procedures, the user equipment may be able to perform a PDCCH/PDSCH reception [S407] and a PUSCH/PUCCH (physical uplink shared channel/physical uplink control channel) transmission [S408] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 5:
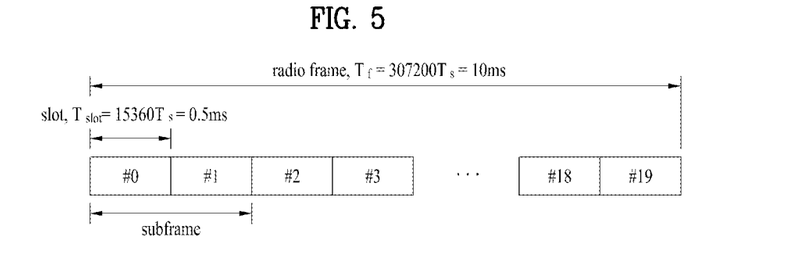
FIG. 5 is a diagram for a structure of a radio frame in a LTE system.

FIG. 5 is a diagram for a structure of a radio frame used in an LTE system.

Referring to FIG. 5, one radio frame has a length of 10 ms (327,200×$T_s$) and is constructed with 10 subframes in equal size. Each of the subframes has a length of 1 ms and is constructed with two slots. Each of the slots has a length of 0.5 ms (15,360×$T_s$). In this case, $T_s$ indicates a sampling time and is represented as $T_s$=1/(15 kHz×2048)=3.2552×$10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 6:
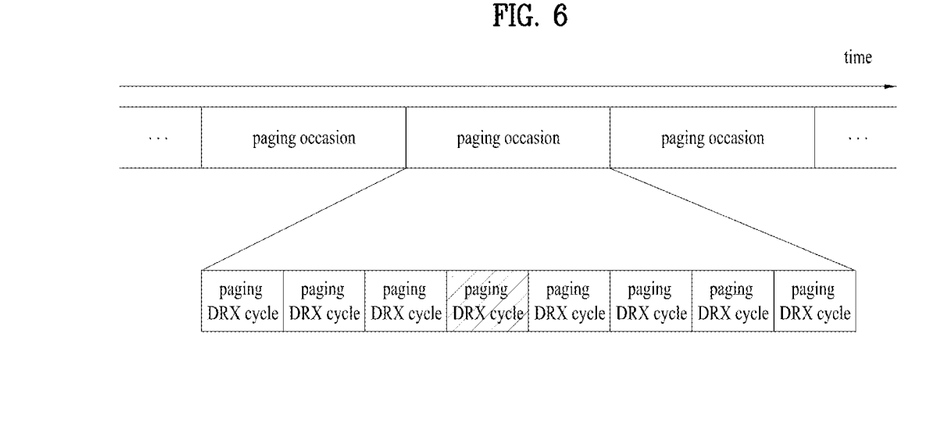
FIG. 6 is a diagram for a general transmitting and receiving method using a paging message.

FIG. 6 is a diagram for explaining a general transceiving method using a paging message.

Referring to FIG. 6, a paging message includes a paging record consisting of a paging cause, a user equipment identity and the like. When the paging message is received, a user equipment may be able to perform a discontinuous reception (DRX) cycle for the purpose of power consumption reduction.

Specifically, a network may configure a plurality of paging occasions (PO) on every time cycle, which is called a paging cycle (paging DRX cycle). And, the network enables a specific user equipment to obtain a paging message by receiving a specific paging occasion only. The user equipment does not receive any paging channel except the corresponding specific paging occasion and may stay in an idle state to reduce power consumption. One paging occasion corresponds to one TTI (transmission time interval).

An eNode B and a user equipment use a paging indicator (hereinafter abbreviated PI) as a specific value for indicating a transmission of a paging message. The eNode B may define a specific identifier (e.g., paging-radio network temporary identity (P-RNTI)) with the purpose of PI usage and then may be able to inform the user equipment of a transmission of a paging information. For instance, the user equipment wakes up on every DRX cycle and then receives one subframe to know whether a paging message has appeared. If the P-RNTI exists on a L1/L2 control channel (PDCCH) of the received subframe, the user equipment may be able to know that a paging message exists on a PDSCH of the corresponding subframe. And, if the paging message includes a user equipment identifier (e.g., IMSI) of the user equipment, the user equipment may be able to receive a service in response to the eNode B (e.g., RRC connection or system information reception).

In the following description, system information is explained. First of all, the system information may include essential information a user equipment should know to access a network. Therefore, the user equipment should receive all system informations before accessing an eNode B and have latest system information all the time. Since system information is the information all user equipments in a cell should be aware of, the eNode B broadcasts the system information periodically.

System information may be divided into a master information block (MIB), a scheduling block (SB) and a system information block (SIB). The MIB enables a user equipment to know a physical configuration, e.g., bandwidth of a corresponding cell. Transmission information (e.g., transmission periods, etc.) of the SIBs are indicated by the SB. The SIB is a set of system informations related to each other. For instance, a specific SIB contains information on a neighbor cell only and a different SIB contains information on an uplink radio channel used by the user equipment only.

In order to inform the user equipment of whether the system information is modified, the eNode B sends a paging message. In this case, the paging message includes a system information change indicator. The user equipment receives the paging message according to a paging cycle. If the paging message includes the system information change indicator, the user equipment receives the system information transmitted via the BCCH, which is a logical channel.

In the following description, an RLF (radio link failure) is explained.

If following problems occur on a radio link, a user equipment can determine that the RLF has occurred.

(1) First of all, the user equipment can determine that the RLF has occurred due to a physical channel problem.

If quality of an RS (reference signal) periodically received from an eNB on a physical channel is detected as less than a threshold, the user equipment can determine that out-of-sync has occurred on the physical channel. If the out-of-sync contiguously occurs as many as specific numbers (e.g., N310), the user equipment informs an RRC of the occurrence. Having received an out-of-sync message from the physical layer, the RRC drives a timer T310 and waits for a resolution of the problem of the physical channel while the T310 is driving. If the RRC receives a message that contiguous in-sync have occurred as many as specific numbers (e.g., N310) from the physical channel while the T310 is driving, the RRC determines that the physical channel problem is resolved and stops driving the T310. Yet, if the RRC does not receive an in-sync message until the T310 expires, the RRC determines that the RLF has occurred.

(2) A user equipment can determine that the RLF has occurred due to a MAC random access problem.

In case of performing a random access procedure on a MAC layer, a user equipment passes through procedures including a random access resource selection->a random access preamble transmission->a random access response reception->a contention resolution. The above-mentioned overall procedures are called a one-time random access procedure. If the procedure is not successfully performed, a next random access procedure is performed after waiting for time as much as backoff time. Yet, if the random access procedure is attempted as many as the prescribed times (e.g., preamble TransMax) and the random access procedure is not successfully performed, the user equipment informs an RRC of the failure and the RRC determined that an RLF has occurred.

(3) A user equipment can determine that the RLF has occurred due to a maximum retransmission problem.

In case of using an AM (Acknowledged Mode) RLC on an RLD layer, the user equipment retransmits an RLC PDU, which is failed to be transmitted. If transmission is not successful despite an AM RLC retransmits the AMD PDU as many as prescribed times (e.g., maxRetxThreshold), the user equipment informs an RRC of the failure and the RRC determines that an RLF has occurred.

The RRC determines whether an RLF occurs using the aforementioned three reasons. If the RLF occurs, a user equipment performs an RRC connection re-establishment procedure to re-establish an RRC connection with an eNB.

The RRC connection re-establishment procedure, which is performed when an RLF occurs, is explained in the following.

If a user equipment determines that a serious problem has occurred in an RRC connection itself, the user equipment performs the RRC connection re-establishment procedure to re-establish a connection with an eNB. The serious problem for the RRC connection includes 5 types of problems including (1) an RLF (radio link failure), (2) a handover failure, (3) Mobility from E-UTRA, (4) a PDCP integrity check failure and (5) an RRC connection reconfiguration failure.

If one of the aforementioned problems occurs, a user equipment drives a timer T311 and initializes an RRC connection reconfiguration procedure. In the middle of the procedure, the user equipment accesses a new cell in a manner of passing through a cell selection, a random access procedure and the like.

If the user equipment finds out an appropriate cell via the cell selection procedure while the timer T311 is driving, the user equipment terminates the T311 and starts the random access procedure to the cell. Yet, if the user equipment does not find out an appropriate cell until the T311 expires, the user equipment determines it as an RRC connection failure and switches to an RRC_IDLE mode.

In particular, if a user equipment, which is RRC connected with a serving cell, detects an RLF (radio link failure) or a handover failure, the user equipment stores information on occurrence of a connection failure, e.g., RLF information.

If the user equipment stores the RLF information, the user equipment reports to an eNB on availability of the RLF information via an RRC connection reestablishment request message in the middle of the RRC connection reestablishment procedure. The user equipment can also report to the eNB on the availability of the RLF information via an RRC connection reconfiguration message.

If the RRC connection reestablishment procedure fails, the user equipment enters into an idle mode (i.e., RRC_IDLE mode). Later, an RRC layer of the user equipment performs an RRC connection establishment procedure according to an indication of a NAS layer and can enter into an RRC connected (i.e., RRC_connected) mode again. In this case, in case of performing the RRC connection establishment procedure, the user equipment can report to the eNB on the availability of the RLF information via an RRC connection establishment completion message. As mentioned in the foregoing description, if the user equipment reports to the eNB on the availability of the RLF information, the eNB requests the RLF information by transmitting a UE information request message to the user equipment.

Having received the UE information request message, the user equipment reports to the eNB on the RLF information via a UE information response message. In this case, the RLF information may include a channel measurement value of a last serving cell, a channel measurement value of a neighboring cell, information on a cell in which an RLF has occurred, information on a location in which an RLF has occurred, information on whether a connection failure corresponds to an RLF or a handover failure, an ID of a cell attempting an RRC connection reestablishment and the like.

According to the aforementioned related art, a user equipment (UE) configures priority of a frequency providing a preferred (interested) MBMS (multimedia broadcast and multicast service) to be higher for cell reselection. Yet, if a highest ranked cell or a best cell on the frequency of high priority is not appropriate, the UE does not consider the cell on the frequency as a candidate for the cell reselection until maximum 300 seconds. And, if an intraFrequencyReselection field within a cellAccessRelatedinfo field of a SysteminformationBlockType1 message is configured as "not allowed", the UE does not select a cell on a frequency identical to a frequency of a barred cell and exclude the barred cell and the cell on the frequency identical to the frequency of the barred cell from a candidate for cell selection/reselection for 300 seconds.

Hence, in this case, although the UE intends to receive a preferred MBMS service from a prescribed cell on an MBMS frequency, it is unable for the UE to receive the preferred MBMS for maximum 300 seconds.

In order to solve the aforementioned problem, the present invention describes a method of performing cell selection/reselection in consideration of a frequency to which high priority is set.

Figure 7:
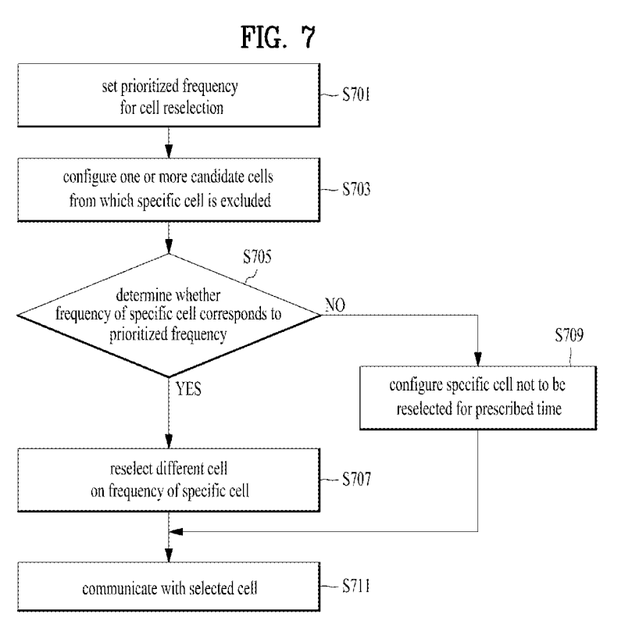
FIG. 7 is a diagram for a method of reselecting a cell according to the present invention.

FIG. 7 is a diagram for a method of reselecting a cell according to the present invention.

Referring to FIG. 7, a user equipment configures a prioritized frequency to reselect a cell in a wireless communication system [S701]. In particular, in case that the user equipment selects/reselects a cell due to a position change of the user equipment and the like, the user equipment can designate a specific frequency as the prioritized frequency to reselect a cell. For instance, the prioritized frequency can be designated by a frequency providing an MBMS (multimedia broadcast and multicast service) or a frequency of a CSG (closed subscriber group) cell to which the user equipment belongs thereto. Preferably, in case that a preferred (interested) service is provided on a specific frequency, priority can be set to be high by a frequency for cell reselection.

After the step S701, the user equipment configures at least one candidate cell(s) from which a specific cell is excluded [S703]. The user equipment excludes a cell according to a specific condition when a cell is reselected and remaining cells can be configured as the candidate cell(s) for the cell selection/reselection. For instance, if the specific cell is not suitable, the specific cell can be excluded when a cell is reselected. Hence, if a status of the specific cell indicates a barred cell or the status of the specific cell is determined as inappropriate, the user equipment can exclude the specific cell when cell reselection is performed.

Or, if an RRC (radio resource control) connection request fails in a specific cell, in other word, if the specific cell is in an RRC idle (RRC_IDLE) state, the specific cell can be configured to be excluded from the cell reselection.

And, if a timer for a cell bar is working in a cell, the cell can be configured to be excluded from the cell reselection.

Having configured at least one candidate cell(s), the user equipment determines whether the frequency of the excluded specific cell corresponds to the prioritized frequency [S705].

If the frequency of the specific cell is identical to the prioritized frequency, the user equipment reselects a different cell on a frequency of a specific cell among the candidate cell(s) [S707].

And, if the frequency of the specific cell is different from the prioritized frequency, the specific cell can be configured not to be reselected for a prescribed time [S709]. In this case, the prescribed time is defined by time configured for cell selection/reselection. For instance, the prescribed time can be configured by maximum 300 ms.

Moreover, processing can be differently performed according to a state that system information of the specific cell is configured. For instance, if an intraFreqReselection field among the system information (a cellAccessRelatedinfo field in a SystemInformationBlockType1 message) of the specific cell is set to "allowed", the specific cell is simply excluded from the candidate cell. Yet, if the field is set to "not allowed", not only the specific cell but also a cell on a frequency identical to the frequency of the specific cell can be excluded from the candidate cell for re-selection.

The user equipment performs communication with a cell selected in accordance with the aforementioned steps S701 to S709 [S711].

In the following, embodiment of the present invention is explained. Yet, the present invention may be not limited by the embodiment explained in the following.

Embodiment 1

In a first embodiment according to the present invention, assume that a user equipment is aware of a frequency providing a preferred MBMS service.

According to the first embodiment of the present invention, the user equipment can configure priority of the frequency providing the MBMS to be highest while an MBMS session is maintained (i.e., MBMS prioritized reselection rule). The user equipment reselects a highest ranked cell or a best cell based on the top priority frequency.

If the highest ranked cell or the best cell, which is selected by the MBMS prioritized reselection rule, is not suitable, the user equipment reselects a different cell on an identical frequency without considering a cell selected as a candidate cell for the cell reselection.

In particular, the user equipment excludes the cell determined as the not suitable cell from the candidate cell for maximum 300 seconds and considers the different cell on the identical frequency as the candidate for the cell reselection.

Embodiment 2

In a second embodiment according to the present invention, assume that a status of a specific cell indicates a cell-barred or is treated as identical to the cell-barred. In this case, the user equipment is not allowed to select/reselect a cell indicating the cell-barred. Moreover, even in emergency calls, the user equipment is not allowed to select/reselect the cell indicating the cell-barred.

According to the second embodiment of the present invention, if a specific cell corresponds to a CSG (closed subscriber group) cell, the user equipment can select a different cell on an identical frequency that satisfies a selection/reselection criteria.

Or, if a specific cell is positioned on a frequency configured with a highest reselection priority, the user equipment can select a different cell on an identical frequency that satisfies a selection/reselection criteria.

Moreover, if an intraFreqReselection field among the system information (a cellAccessRelatedinfo field in a SystemInformationBlockType1 message) of a specific cell indicates "allowed", the user equipment can select a different cell that satisfies a selection/reselection criteria. In this case, the user equipment can exclude a barred cell from a candidate cell for the cell selection/reselection for 300 seconds.

If the intraFreqReselection field indicates "not allowed", the user equipment does not reselect a cell having a frequency identical to a frequency of a barred cell. In this case, if a specific cell corresponds to a cell on a frequency (prioritized frequency) to which top priority is set by the user equipment, the user equipment selects a different cell that satisfies a selection/reselection criteria. Yet, if the specific cell does not correspond to the cell of the prioritized frequency, the user equipment can exclude a barred cell and a cell on a frequency identical to a frequency of the barred cell from a candidate for the cell selection/reselection for 300 seconds.

Figure 8:
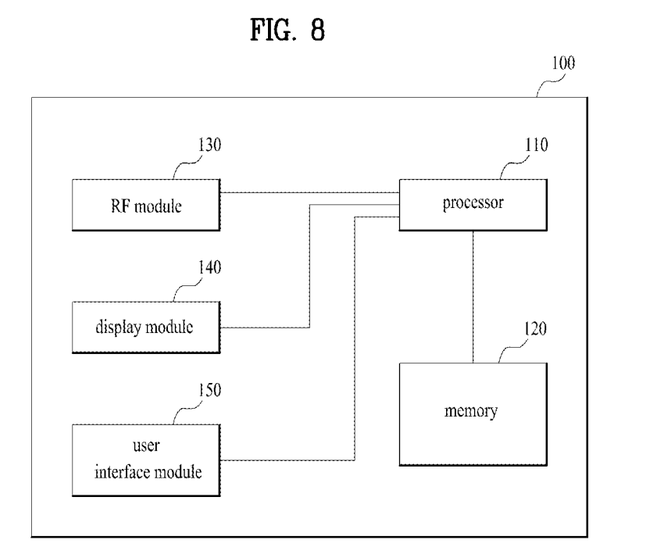
FIG. 8 is a diagram for an example of a base station and a user equipment applicable to embodiment of the present invention.

FIG. 8 is a diagram for an example of a base station and a user equipment applicable to embodiment of the present invention.

Referring to FIG. 8, a communication device 100 may include a processor 110, a memory 120, an RF module 130, a display module 140, and a user interface module 150.

Since the communication device 100 is depicted for clarity of description, prescribed module(s) may be omitted in part. The communication device 100 may further include necessary module(s). And, a prescribed module of the communication device 100 may be divided into subdivided modules. A processor 110 is configured to perform an operation according to the embodiments of the present invention illustrated with reference to drawings. In particular, the detailed operation of the processor 110 may refer to the former contents described with reference to FIG. 1 to FIG. 7.

The memory 120 is connected with the processor 110 and stores an operating system, applications, program codes, data, and the like. The RF module 130 is connected with the processor 110 and then performs a function of converting a baseband signal to a radio signal or a function of converting a radio signal to a baseband signal. To this end, the RF module 130 performs an analog conversion, amplification, a filtering, and a frequency up conversion, or performs processes inverse to the former processes. The display module 140 is connected with the processor 110 and displays various kinds of informations. And, the display unit 140 can be implemented using such a well-known component as an LCD (liquid crystal display), an LED (light emitting diode), an OLED (organic light emitting diode) display and the like, by which the present invention may be non-limited. The user interface module 150 is connected with the processor 110 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the data transmission/reception relations between a user equipment and an eNode B. In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method for a user equipment to reselect a cell in a wireless communication system and apparatus therefor are described with reference to examples applied to 3GPP LTE system, it may be applicable to various kinds of wireless communication systems as well as to the 3GPP LTE system.

What is claimed is:

1. A method of performing a cell reselection by a user equipment in a wireless communication system, the method comprising:
   setting a prioritized frequency to perform the cell reselection, wherein the prioritized frequency corresponds to a frequency providing a multimedia broadcast and multicast service (MBMS);
   configuring one or more candidate cells from which a specific cell on a first frequency is excluded, wherein the one or more candidate cells include a first cell and a second cell;
   if an intraFreqReselection field contained in system information of the specific cell is set to "allowed", reselecting a different cell on the first frequency among the one or more candidate cells; and
   if the intraFreqReselection field contained in the system information of the specific cell is set to "not-allowed", reselecting the first cell on the first frequency when the first frequency is identical to the prioritized frequency, and configuring the second cell on the first frequency not to be reselected for the prescribed time when the first frequency is not identical to the prioritized frequency.

2. The method of claim 1, wherein the specific cell corresponds to a cell indicating that a status of the specific cell is cell-barred.

3. The method of claim 1, wherein the specific cell corresponds to a cell of which an RRC (radio resource control) connection request has failed.

4. The method of claim 1, wherein the specific cell corresponds to a cell in which a timer for a cell-barred is working.

5. A user equipment performing a cell reselection in a wireless communication, the user equipment comprising:
   a radio frequency unit (RF unit); and
   a processor configured to:
   set a prioritized frequency to perform the cell reselection, wherein the prioritized frequency corresponds to a frequency providing a multimedia broadcast and multicast service (MBMS),
   configure one or more candidate cells from which a specific cell on a first frequency is excluded, wherein the one or more candidate cells include a first cell and a second cell,
   if an intraFreqReselection field contained in system information of the specific cell is set to "allowed", reselect a different cell on the first frequency among the one or more candidate cells, and
   if the intraFreqReselection field contained in the system information of the specific cell is set to "not-allowed", reselect the first cell on the first frequency when the first frequency is identical to the prioritized frequency, and configure the second cell on the first frequency not to be reselected for the prescribed time when the first frequency is not identical to the prioritized frequency.

* * * * *